E. NORTON.

Canister,

No. 8,249. Reissued May 21, 1878.

Witnesses:

H. F. Burns

O. W. Bond

Inventor:

Edwin Norton

By Wait & Bond Attys.

N. PETERS, PHOTO-LITHOGRAPHER, WASHINGTON, D. C.

UNITED STATES PATENT OFFICE.

EDWIN NORTON, OF CHICAGO, ILLINOIS.

IMPROVEMENT IN CANISTERS.

Specification forming part of Letters Patent No. 195,301, dated September 18, 1877; Reissue No. 8,249, dated May 21, 1878; application filed May 14, 1878.

*To all whom it may concern:*

Be it known that I, EDWIN NORTON, of Chicago, in the county of Cook and State of Illinois, have invented certain new and useful Improvements in Canisters; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to that class of cans, caddies, or packages which are used in retail-stores for holding teas, coffees, spices, or other goods; and it consists in providing said caddies (which are usually japanned and ornamented) with a series of names of various kinds of goods which are kept in them, so arranged that the owner can easily change them without loss of time.

It also consists in cutting away the front of the can or caddy for the purpose of showing the movable label inside of the can, all as hereinafter more fully set forth.

Figure 1:
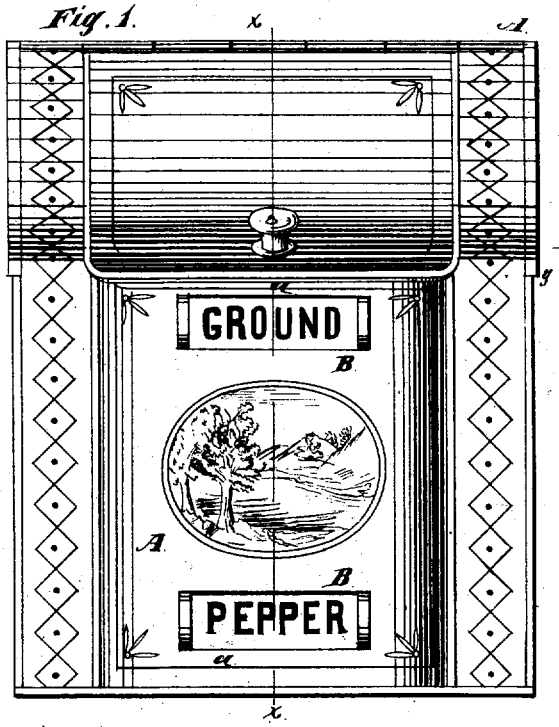
Figure 4:
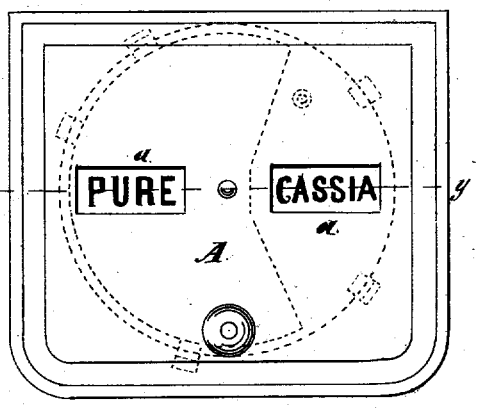
Figure 5:
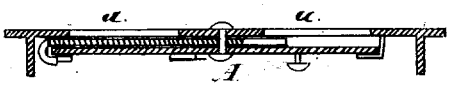
Figure 3:
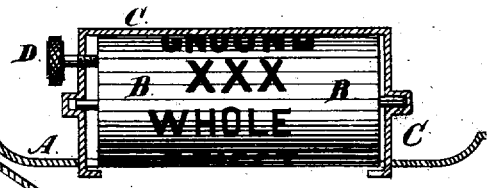
Figure 2:
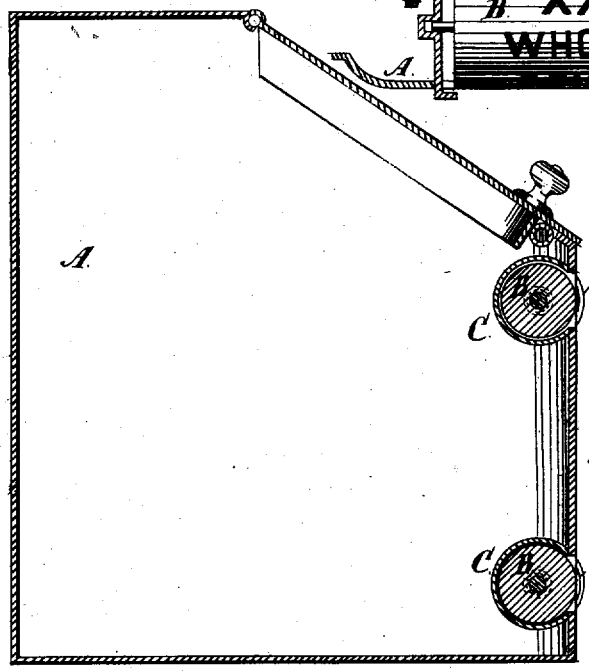

In the annexed drawing, to which reference is made, and which fully illustrates my invention, Figure 1 is a front elevation. Fig. 2 is a central vertical section on line *x x*, Fig. 1. Fig. 3 is an enlarged detail view. Fig. 4 is a modification, and Fig. 5 is a section through line *y y* of the same.

A represents a caddy, can, or other similar package, such as are used in retail-stores for holding teas, coffees, spices, or other goods.

Dealers who carry a stock of such cans or caddies have always had great trouble in filling orders, from the fact that the names and grades of goods are branded upon them, and, while having an overstock of some marks, they will be out of others; hence they could not fill their orders without sending away to the manufacturer for more cans having desired marks.

Users of these cans have also had trouble from selling out all of the goods marked on the can, and, not being able to substitute another name, have been led into mistakes, which, with the use of my improvement, would be avoided, as it is but the work of a moment to change the name without injuring the name removed, which can be replaced when needed.

The invention consists in providing a series of names upon one or more movable plates secured upon the inside of the can, and having one or more openings in the can cut away, so that the name required may be rotated or pushed into view through said opening, the plate being then secured in position by any of the known appliances for this purpose.

I prefer to make these movable plates in the form of rollers, as shown at B B, which work upon journals in cylindrical casings C C, secured on the inside of the can.

Upon one of the rollers are the names of eight different spices, while on the other are the names of eight different grades, permitting in each caddy sixty-four changes of marks, and each roller being turned so as to show either one of the names or marks through openings *a a*, cut or otherwise made in the front of the caddy.

A set-screw, D, is passed through one end of each casing C, for the purpose of securing the roller B therein in the desired position.

This construction prevents the contents of the can from coming in contact with the ornamental names on the rollers, which would soil them, and also allows of a number of names in the most practical and compact form.

Other equivalent devices may be used instead of the rollers, such as, for instance, flat registering-plates having the names, and revolving on a central pivot, with one or more openings in the can to show the names through; or the required number of names may be lettered upon separate flat plates and put into the case, made of convenient form, with an opening in the front, and attached to the can or package, so that the one required could show at the opening, while all the rest were concealed.

In this class of storage-cans the labels have heretofore been painted on or otherwise permanently attached to the can, which limited the can to the use specified by the marking, when, by my arrangement, the same can may be used for various purposes, and have labels correctly indicating the contents. By locating them and the fastenings on the inside, the labels cannot be tampered with or be accidentally shifted, so as to indicate the character of the contained goods incorrectly.

What I claim as new, and desire to secure by Letters Patent, is—

1. A can or caddy provided with one or more openings, in combination with one or more movable plates having a series of labels or names, which may be brought into view, substantially as and for the purpose specified.

2. A can or caddy provided with one or more labels inclosed in casings on the inside of the can, and provided with an inside fastening device, to prevent tampering with the labels, substantially as set forth.

3. A can or caddy having two openings, in combination with two revolving labels inclosed within the case, and a fastening device, whereby spices of different kinds, and also different qualities, may be labeled, substantially as and for the purpose set forth.

EDWIN NORTON.

Witnesses:
E. A. WEST,
O. W. BOND.